United States Patent Office 3,337,504
Patented Aug. 22, 1967

3,337,504
STABILIZATION OF OXYMETHYLENE POLYMERS WITH TRIOXANE HYDROXYL CONTAINING REACTANTS
Gene J. Fisher, Corpus Christi, Tex., assignor to Celanese Corporation, New York, N.Y., a corporation of Delaware
No Drawing. Filed Sept. 6, 1963, Ser. No. 306,998
6 Claims. (Cl. 260—67)

This invention relates to stabilized polymers and, more particularly, to polymers which are comparatively stable against degradation but which are derived from polymers which have a higher susceptibility to such degradation. The invention also relates to method of stabilizing such polymers.

Certain polymers are comprised of comparatively stable and comparatively unstable monomeric units and many times the resistance of such polymers to degradation depends upon the relative location of the aforementioned stable and unstable monomeric units. For example, if a polymer is susceptible to degradation by a mechanism which attacks the ends of the polymer molecules it can be seen that if the ends of the molecules are susceptible to degradation, the polymer will have less stability than if the molecule ends are relatively stable to degradation.

While the subject invention will be described with reference to thermally stabilized oxymethylene polymers it should not be limited thereto as the principles of the invention are applicable to other polymers having appropriate stable and unstable units.

In general, the invention involves the stabilization of a polymer having stable and unstable units in its molecules by treating the polymer in such a way as to selectively degrade the polymer and remove unstable units from its molecules.

In a preferred embodiment of this invention there is provided a method of stabilizing a heterogeneous polymer against thermal degradation wherein the unstabilized polymer is susceptible to such degradation inasmuch as it contains monomeric units of comparatively high susceptibility to thermal degradation which are interspersed with other monomeric units which are comparatively stable to thermal degradation. The invention comprises subjecting the polymer to a treatment to degrade the end portions of the molecules of the polymer which are made up of the comparatively susceptible monomeric units thereby leaving a residual polymer having the comparatively stable monomeric units in terminal portions of its molecules. In one embodiment of this invention at least 50 and preferably at least 80% of the polymeric chains of the molecules of the treated polymer have comparatively stable, or comparatively thermal-resistant, units in terminal positions.

Oxymethylene polymers, having recurring —OCH$_2$— units directly attached to each other, have been known for many years. They may be prepared by the polymerization of anhydrous formaldehyde or by the polymerization of trioxane, which is a cyclic trimer of formaldehyde. High molecular weight oxymethylene polymers vary in thermal stability and, in accordance with a preferred embodiment of this invention, the polymer which is stabilized is an oxymethylene polymer containing carbon-to-carbon single bonds in the main polymer chain.

In a particularly preferred embodiment of our invention the polymeric compounds to be treated are oxymethylene copolymers having at least one chain containing recurring oxymethylene units interspersed with

—OR— groups in the main polymer chain, where R is a divalent radical containing at least two carbon atoms directly linked to each other and positioned in the polymer chain between the two valences, with any substituents on said R radical being inert, that is those which are free of interfering functional groups and will not induce undesirable reactions. Particularly preferred are copolymers which contain from 60 to 99.6 mol percent of recurring oxymethylene groups. In a preferred embodiment R may be, for example, an alkylene or substituted alkylene group containing at least two carbon atoms.

Among the copolymers which may be utilized in accordance with this aspect of the invention are those having a structure comprising recurring units having the formula

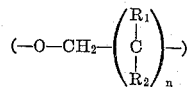

wherein $n$ is an integer from zero to 5 and wherein $n$ is zero in from 60 to 99.6 percent of the recurring units. $R_1$ and $R_2$ are inert substituents, that is, substituents which are free of interfering functional groups and will not induce undesirable reactions.

A preferred class of copolymers are those having a structure comprising oxymethylene and oxyethylene recurring units wherein from 60 to 99.6 percent of the recurring units are oxymethylene units.

Particularly preferred oxymethylene polymers are those having incorporated therein oxyalkylene units having adjacent carbon atoms which are derived from cyclic ethers having adjacent carbon atoms. These copolymers may be prepared by copolymerizing trioxane or formaldehyde with a cyclic ether having the structure

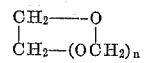

where $n$ is an integer from zero to 2.

Examples of preferred polymers include copolymers of trioxane and cyclic ethers containing at least two adjacent carbon atoms such as the copolymers disclosed in U.S. Patent No. 3,027,352 by Cheves T. Walling, Frank Brown and Kenneth W. Bartz, which patent is assigned to the same assignee as the subject application.

Among the specific cyclic ethers which may be used are ethylene oxide; 1,3-dioxolane; 1,3,5-trioxepane; 1,3-dioxane; trimethylene oxide, pentamethylene oxide; 1,2-propylene oxide; 1,2-butylene oxide; neopentyl formal; pentaerythritol diformal; paraldehyde; tetrahydrofuran and butadiene monoxide.

Other oxymethylene polymers and methods of preparation therefor are disclosed by Kern et al. in Angewandte Chemie, 73(6), 177–186 (Mar. 21, 1961), including polymers containing repeating carbon-to-carbon single bonds in the polymer chain by copolymerizing trioxane with cyclic ethers such as dioxane, lactones such as beta-propiolacetone, anhydrides such as cyclic adiphic anhydride and ethylenically unsaturated compounds such as styrene, vinyl acetate, vinyl methyl ketone, acrolein, etc.

As used in the specification and claims of the subject application, the term "oxymethylene" includes substituted oxymethylene, where the substituents are inert with respect to the reactions in question, that is, the substituents are free of interfering functional groups and will not introduce undesirable reactions.

As used in the specification and claims of this application, the term "copolymer" means polymers having two or more monomeric groups, including terpolymers and higher polymers. Suitable terpolymers include those disclosed in U.S. patent application Ser. No. 229,715, filed Oct. 10, 1962, by W. E. Heinz and F. B. McAndrew, which is assigned to the same assignee as the subject application.

The preferred polymers which are treated in this invention are thermoplastic materials having a melting point of at least 150° C. and are normally millable at a temperature of 200° C. They have a number average molecular weight of at least 10,000. These polymers have a high thermal stability before treatment in accordance with this invention but this stability is markedly improved by such treatment. For example, if a sample of the polymer which has been treated in accordance with this invention, and which has also been chemically stabilized as described below, is placed in an open vessel in a circulating air oven at a temperature of 230° C. and its weight loss is measured without removal of the sample from the oven, it will have a thermal degradation rate of less than 1.0 wt. percent/min. for the first 45 minutes and, in preferred instances, less than 0.1 wt. percent/min. for the same period of time.

The preferred polymers which are treated in this invention have an inherent viscosity of at least one (measured at 60° C. in an 0.1 weight percent solution in p-chlorophenol containing 2 weight percent of α-pinene). After treatment the preferred copolymers exhibit remarkable alkaline stability. For example, if the treated copolymers are refluxed at a temperature of about 142°–145° C. in a 50% solution of sodium hydroxide in water for a period of 45 minutes, the weight of the copolymer will be reduced by less than one percent.

Any of the known catalysts suitable for the polymerization of trioxane itself or with other materials may be used in accordance with this invention.

Preferred catalysts are cationic catalyst including such inorganic fluorine-containing catalyst as boron trifluoride, antimony trifluoride, antimony fluoroborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorous pentafluoride, hydrogen fluoride and compounds containing these materials such as boron fluoride coordinate complexes with organic compounds, particularly those in which oxygen or sulfur is the donor atom.

Other suitable catalysts include thionyl chloride, fluorosulfonic acid, methane sulfonic acid, phosphorous trichloride, titanium tetrachloride, ferric chloride, zirconium tetrachloride, aluminum trichloride, stannic chloride and stannous chloride.

The particularly preferred catalysts are boron fluoride and boron fluoride-containing materials such as boron fluoride monohydrate, boron fluoride dihydrate and boron fluoride trihydrate as well as the previously mentioned boron fluoride coordinate complexes with organic compounds.

The coordinate complex of boron fluoride may, for example, be a complex with a phenol, an ether, an ester, or a dialkyl sulfide. Boron fluoride dibutyl etherate, the coordinate complex of boron fluoride with dibutyl ether, is a preferred coordinate complex. The boron fluoride complex with diethyl ether is also very effective. Other boron fluoride complexes which may be used are the complexes with methyl acetate, with ethyl acetate, with phenyl acetate, with dimethyl ether, with methyl phenyl ether and with dimethyl sulfide. Suitable catalysts are disclosed in U.S. Patents 2,989,505, 2,989,506, 2,989,507, 2,989,508, 2,989,509 all of which are by Donald E. Hudgin and Frank M. Berardinelli; 2,989,510 by George J. Bruni; and 2,989,511 by Arthur W. Schnizer. All the above patents are assigned to the same assignee as the subject application.

The coordinate complex of boron fluoride should be present in the polymerization zone in amounts such that its boron fluoride content is between about 0.001 and about 1.0 weight percent based on the weight of the monomers in the polymerization zone. Preferably, amounts between about 0.003 and about 0.1 weight percent should be used.

The monomers in the reaction zone are preferably anhydrous or substantially anhydrous. Small amounts of moisture, such as may be present in commercial grade reactants or may be introduced by contact with atmospheric air, will not prevent polymerization, but should be removed for best yields.

In preparing the preferred copolymers, the trioxane, cyclic ether and catalyst are dissolved in a common anhydrous solvent such as cyclohexane, and permitted to react in a reaction zone. The temperature in the reaction zone may vary about 0° C. to about 120° C. The period of reaction may vary from about 5 minutes to about 72 hours. Pressures from subatmospheric to about 100 atmospheres, or more, may be used, although atmospheric pressure is preferred.

The chemical constitution of the cyclic ether must be considered. Thus, 1,3- dioxolane contains both an oxymethylene group and an oxyethylene group. Its incorporation into the copolymer molecule increases both the oxymethylene and the oxyethylene content of the polymer molecule.

In general, the cyclic ether is present in the reaction mixture in amounts between about 0.2 and about 30 mol percent, based on the total mols of monomer. The optimum proportion will depend on the particular copolymer desired, the expected degree of conversion and the chemical constitution of the cyclic ether used.

The copolymers produced from the preferred cyclic ethers have a structure substantially composed of oxymethylene and oxyethylene groups in a ratio from about 250:1 to about 1.5:1.

Upon completion of the polymerization reaction it is desirable to neutralize the activity of the polymerization catalyst since prolonged contact with the catalyst degrades the polymer. The polymerization product may be treated with an aliphatic amine, such as tri-n-butylamine or triethylamine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of suitable methods of neutralizing catalyst activity may be found in U.S. Patent No. 2,989,509 by Donald E. Hudgin and Frank M. Berardinelli, assigned to the same assignee as the subject application.

In accordance with one aspect of the invention, a polymer containing stable and unstable portions is subjected to treatment with a reactant to selectively degrade the polymer and remove unstable portions from its molecules, while solid polymer particles are in contact with a liquid medium comprising trioxane. Preferably the liquid medium is at a temperature above that at which the polymer begins to swell but below that at which the polymer agglomerates, becomes tacky or dissolves in the medium. This temperature range may be referred to as the "swell temperature range." Moreover, it is preferred that the polymer particles are immersed in the liquid during the reaction.

The swell temperature range varies with the proportions of the components of the liquid medium but it is preferred to perform the reaction at a temperature between about 120° C. and about 155° C. At higher temperatures within this range the hydrolysis treatment is preferably conducted under sufficient pressure to maintain the liquid phase. The preferred temperature range is between about 130° C. and about 148° C.

The liquid medium should contain between about 5 and about 60% trioxane (based on the total weight of the liquid medium), and preferably between 5 and 40%.

It is generally suitable for the liquid medium to contain water, in great enough amount to cause the polymer to remain undissolved at the temperature of the reaction, and such temperature has an effect on the amount of water which is used. In most cases, the amount of water present in the medium may be varied, for example within the range of 40 to 95%, preferably 75 to 95% based on the weight of the total liquid medium.

It is desirable, in certain instances, to replace part or all of the water in the liquid medium with an organic compound containing at least one hydroxyl group, such compounds comprising alcohols, including primary alcohols such as methyl alcohol, ethyl alcohol, n-propyl alcohol, n-hexyl alcohol, etc.; secondary alcohols such as isopropyl alcohol, secondary butyl alcohol, 3-methyl-2-butanol, etc.; tertiary alcohols such as tertiary butyl alcohol, 2-methyl-2-butanol, 2-methyl-2-pentanol, etc.; unsaturated alcohols such as allyl alcohol, vinyl alcohol, propargyl alcohol, etc.; polyhydroxy alcohols such as ethylene glycol, propylene glycol, trimethylene glycol, 1,2-butanediol, pentamethylene glycol, glycerol, erythritol, sorbitol, quercitol, inositol, etc.; aromatic alcohols such as benzyl alcohol, α-phenylethyl alcohol, β-phenylethyl alcohol, ortho-methylbenzyl alcohol, diphenyl carbinol, triphenyl carbinol, etc. Particularly preferred compounds are the water soluble, normally liquid alkanols.

The terminal units of the oxymethylene polymer are often hydroxy-substituted oxymethylene

units and detachment of an oxymethylene group from the polymer molecule by the hydrolysis reaction has the effect of shifting the hydrogen atoms of the hydroxyl group to the oxygen atom of the next adjacent oxymethylene group.

When oxyethylene units, for example, are incorporated in the polymer chain by copolymerization as described above, the successive detachment of oxymethylene units takes place until an oxyethylene unit becomes the terminal unit of the chain. The oxyethylene units, having carbon-to-carbon bonds therein, are comparatively resistant to such detachment, and remain attached to the polymeric chain in the terminal position and protect the internal oxymethylene units from further hydrolytic removal. Since oxyethylene units are also resistant to detachment by heat, the degraded molecule has a better initial thermal stability than the original copolymer from which it was derived.

It has been found that the products of the selective treatment of this invention, after substantially constant weight is achieved, are also extremely stable against attack by the reaction conditions. The treatment produces a weight loss at a first, comparatively high, rate, which, after the treatment continues for a suitable period of time, drops to a rate less than 20% of the first rate loss, and, most preferably, between 0.1% and 5% of the first rate loss. Thus, in a preferred embodiment, the polymer is subjected to the reaction conditions until it achieves substantially constant weight. Thus, an oxymethylene copolymer having had the hydrolytic treatment, is not only thermally stable but is also extremely stable against such further hydrolytic treatment even at conditions more severe than those of the treatment and despite the fact that the polymer still has a substantial content of internal oxymethylene units which are normally subject to degradation by alkaline hydrolysis unless protected by suitable end groups which are resistant to degradation under such conditions.

In a preferred embodiment of this invention the polymer is subjected to the hydrolysis under alkaline conditions. The alkaline material is preferably water soluble, or soluble in the organic hydroxy-containing material, and may be a strongly basic hydroxide such as the hydroxide of an alkali metal, or alkaline earth metal, or it may be the salt of a strong base and weak acid, or it may be ammonia or an organic base, such as an amine or an amidine.

Suitable alkaline materials include ammonium hydroxide, sodium hydroxide, potassium hydroxide, sodium carbonate, sodium acetate, triethanolamine, tripropyl- amine, trimethylguanidine, trimethylamine, tributylamine, etc.

In a preferred embodiment the amount of alkaline material present in the chemical reaction is from 0.001 weight percent to about 10.0 weight percent, most preferably between about 0.001 weight percent and about 1.0 weight percent. When no alkaline material is used it may be desirable to have the reaction take place in a buffered system since some of the products of the hydrolysis are acidic and would thereupon cause the system to become acidic which might have deleterious effects on the polymer.

In addition alkaline hydrolysis is preferable over neutral hydrolysis since it is faster and since the alkaline material will neutralize any excess polymerization catalyst which might otherwise tend to degrade the polymer during the hydrolysis step.

The liquid medium is suitably used in amounts between about 1 and about 20 pounds per pound of copolymer and preferably between about 4 and about 10 pounds per pound of copolymer.

The hydrolysis reaction may take from about 15 seconds to about 1 hour with from about 5 to 20 minutes being preferred.

In one advantageous method of operation, the polymerization product may be quenched with a quenching medium which is also suitable as a hydrolysis medium. For example, a polymerization product removed from a polymerization zone at a temperature between about 60° and about 116° C. may be quenched with from about 5 to 50 times its weight of a water-trioxane mixture containing from about 1 to about 30 wt. percent of trioxane, based on the weight of the mixture. The mixture of polymerization product and quench medium is wet ground to break up the larger particles of polymer and the slurry (having from about 2 to about 20 wt. percent of solids) is suitable for hydrolysis. From about 10 to about 5000 p.p.m. of ammonia (based on the weight of solid polymer) is added and the slurry is heated until it reaches a temperature between about 120° C. and about 155° C. and a pressure between about 15 and 100 p.s.i.g. Under these conditions, the polymer swells but does not dissolve in the slurry medium. The period during which the mixture is held at these conditions may range, for example, between about 0.5 and about 20 minutes.

During the hydrolysis reaction a portion of the copolymer is decomposed to formaldehyde resulting in a weight loss of copolymer. It is believed that the formaldehyde is formed by the successive detachment of the terminal oxymethylene units from the ends of the polymer chain. The hydrolytic degradation of unstable groups is complete when the weight loss substantially ceases. Typically, between about 3 and 40 weight percent of polymer may be lost before the rate of weight loss drops to between about 0.1% and 10% of the initial rate of weight loss (of the unhydrolyzed polymer) indicating substantial completion of the hydrolysis process.

The use of a liquid medium comprising trioxane and no more than a minor amount of another organic compound makes possible an economic advantage due to the elimination of facilities such as a distillation column which may be necessary for the recovery of such other compound. Moreover, the carrying out of the hydrolysis reaction while solid polymer particles are in contact with the liquid medium rather than dissolved in it makes possible the recovery of hydrolyzed polymer containing substantially less liquid. This in turn simplifies the steps of filtering and drying the polymer.

The process of this invention is suitably carried out at a temperature range such as that given above, e.g. 120 to 155° C., which is above that at which the preparation of the polymer by polymerization, e.g. with a cationic catalyst such as one comprising boron trifluoride, is normally accomplished. Moreover, the polymer treated in accordance with this invention has usually been previously quenched with a catalyst deactivation agent, e.g., an aqueous and/or alkaline wash liquid as disclosed in Patent No. 2,989,509, to neutralize or deactivate the acidic catalyst. Thus, substantially no active catalyst is present and substantially no polymerization takes place during the hydrolysis reaction. In addition, as brought out above, the reaction is preferably carried out in the presence of a hydroxy compound such as water or an alcohol which is usually not present during the polymerization reaction.

In a preferred embodiment of this invention it is generally desirable to incorporate one or more thermal stabilizers into the copolymer in order to bring its thermal degradation rate even lower. The proportion of stabilizer incorporated depends upon the specific stabilizer used. A proportion between about 0.05 and 10 weight percent (based on the weight of polymer) has been found to be suitable for most stabilizers.

One suitable stabilizer system is a combination of (1) an antioxidant ingredient, such as phenolic antioxidant and most suitably a substituted bisphenol, and (2) an ingredient to inhibit chain scission, generally a compound or a polymer containing trivalent nitrogen atoms.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis-(4-methyl-6-tertiary butyl phenol) and 4,4'-butylidene bis-(6-tertiary butyl-3-methyl phenol). Suitable phenolic stabilizers other than alkylene bisphenols include 2,6-ditertiary butyl-4-methyl phenol, octyl phenol and p-phenyl phenol.

Suitable scission inhibitors include carboxylic polyamides, polyurethanes, substituted polyacrylamides, polyvinyl pyrrolidone, hydrazides, compounds having 1 to 6 amide groups, proteins, compounds having tertiary amine and amide groups, compounds having amidine groups, cycloaliphatic amine compounds and aliphatic acylureas.

The stabilizers may be incorporated into the polymer by dissolving both the polymer and the stabilizer in a common solvent and thereafter evaporating the solution to dryness. Alternatively, the stabilizers may be incorporated into the polymer by applying a solution of the stabilizer to finely divided polymer, as in a slurry, and thereafter filtering the polymer and evaporating to dryness. The stabilizer, in finely divided dry state, may be blended into finely divided polymer in any suitable blending apparatus.

One suitable method of incorporation of the chemical stabilizers is by blending a dry solid stabilizer into the plastic polymer, while the latter is being kneaded as on heated rolls or through an extruder.

The swell temperature range of the polymer in the liquid medium may be determined by placing a mixture of the polymer and the liquid in a glass ampule and sealing. The ampule is then placed in an oil bath which is heated at the rate of 1 to 2 degrees per minutes while mechanically agitating the ampule. One end of the ampule is alternately raised and lowered allowing the mixture to flow from one end to the opposite end of the ampule. During heating the physical appearance is observed constantly by visual inspection. The point at which an increase in the size of the polymer particles is visually observed is considered to be the initial swell. The maximum swell generally occurs about 1 to 2° C. below the agglomeration temperature, i.e., the temperature at which the polymer becomes tacky and adheres to the walls of the ampule instead of flowing freely from one end to the other. The maximum swell temperature is readily determined because all of the polymer particles appear to increase in size and the resulting increase in volume ratio of polymer to liquid medium is apparent.

The following examples further illustrate the invention.

*Example I*

A copolymer of trioxane and ethylene oxide was prepared from a monomeric mixture containing 2.0 wt. percent of ethylene oxide using a boron trifluoride polymerization catalyst and the copolymer was quenched in an aqueous wash liquid to neutralize or inactivate the catalyst as disclosed in U.S. Patent No. 2,989,509. The copolymer was then charged to a shaker agitated vessel together with a hydrolysis liquid containing 10 wt. percent of trioxane, 0.5 wt. percent of ammonia and the remainder water, to yield a mixture containing 13 wt. percent of copolymer. After closing the vessel, the mixture was quickly heated while agitating to a temperature in the swell temperature range of 140–142° C., at which it was kept for 15 minutes. The mixture was then quickly cooled by means of a cooling coil located in the vessel. After reduction of the pressure to atmospheric, the mixture was removed from the vessel and filtered to yield a polymer filter cake containing about 60 wt. percent of liquid. The polymer was washed with acetone and dried at 100° C. under reduced pressure and the dried polymer was then mixed at 210° C. for seven minutes in a Brabender Plastograph with 0.5 wt. percent of 2,2'-methylene bis (4-methyl-6-tertiary butyl phenol) and 0.1 wt. percent of cyanoguanidine based on the weight of the polymer.

The average thermal degradation rate of the stabilized polymer, when heated for 45 minutes at 230° C. in an open vessel in a circulating air oven, was 0.008 wt. percent per minute.

An identical polymer, chemically stabilized as above, but not hydrolyzed had a thermal degradation rate of about 0.05–0.07 weight percent per minute under the same conditions.

*Example II*

The procedure of Example I was repeated except that the hydrolysis liquid was composed of 20 wt. percent of trioxane, 0.1 wt. percent of ammonia and the remainder water, the total mixture in the vessel contained 18 wt. percent of polymer, and the temperature within the swell temperature range at which the mixture was held for 15 minutes was 131–134° C.

The average thermal degradation rate determined as described in Example I was 0.012 wt. percent per minute.

In addition to heterogeneous oxymethylene polymers containing unstable end portions and stable portions as part of the same molecule, e.g. as in the case with copolymers of trioxane and cyclic ethers containing adjacent carbon atoms, the process of this invention is also suitable for the treatment of polymers made up of a mixture of stable and unstable whole molecules, e.g. such as occurs when an oxymethylene homopolymer mass is treated to "cap" only a portion of the ends of the molecules with such stable groups as ether groups, e.g., methoxy groups. In this case, the mass of polymer is made up of stable molecules having both ends capped with such stable groups, and unstable molecules with at least one end remaining uncapped. The treatment will thus result in the complete degradation of the unstable molecules leaving a residue of stable molecules.

It is to be understood that the foregoing detailed description is given merely by way of illustration and that many variations may be made therein without departing from the spirit of my invention.

The embodiments of the invention in which an exclusive property or privilege is claimed are defined as follows:

1. The process for the stabilization of a normally solid oxymethylene copolymer having a melting point above about 150° C. the molecules of said copolymer containing from 60 to 99.6 mol percent of comparatively unstable monomeric oxymethylene units interspersed with comparatively stable monomeric —OR— units wherein R is a divalent radical containing at least two carbon atoms directly linked to each other and positioned in the polymer chain between the two valences with any substituents on said R radical being inert, at least part of the terminal portions of said molecules comprising said unstable monomeric units, said process comprising
(1) reacting said polymer, in solid particulate form, with a reactant comprising
  (a) between about 5 and about 60% trioxane, and
  (b) between about 40 and about 95% of a hydroxy-containing material selected from the group consisting of water, an alcohol and mixtures thereof and
  (c) from about 0.001% to about 10.0% of alkaline material
at a temperature within the swell temperature range of said polymer in said reactant, said temperature being between about 120° C. and about 155° C., said reaction producing a weight loss of said polymer at a first rate, and
(2) continuing said reaction for a time sufficient
  (a) to remove at least 50% of said unstable monomeric units from the terminal portions of said molecules and
  (b) to reduce the polymer rate weight loss to between about 0.1% and about 5% of said first weight loss rate.

2. The process of the stabilization of a normally solid oxymethylene copolymer having a melting point above about 150° C. the molecules of said copolymer containing from 60 to 99.6 mol percent of comparatively unstable monomeric oxymethylene units interspersed with comparatively stable monomeric —OR— units wherein R is a divalent radical containing at least two carbon atoms directly linked to each other and positioned in the polymer chain between the two valences with any substituents on said R radical being inert, at least part of the terminal portions of said molecules comprising said unstable monomeric units, said process comprising
(1) reacting said polymer, in solid particulate form, with a reactant comprising
  (a) between about 5 and about 6% trioxane, and
  (b) between about 40 and about 95% of a hydroxy-containing material selected from the group consisting of water, an alcohol and mixtures thereof
at a temperature within the swell temperature range of said polymer in said reactant, and
(2) continuing said reaction for a time sufficient
  (a) to remove at least 50% of said unstable monomeric units from the terminal portions of said molecules.

3. The process of claim 2 wherein said stable units are oxyalkylene units containing at least two carbon atoms.

4. The process of claim 3 wherein said stable units are oxyethylene units.

5. The process of claim 2 wherein said reaction is continued until at least about 80% of the polymeric chains of the treated polymer have comparatively stable monomeric units in terminal positions.

6. The process of claim 2 wherein said reaction produces a weight loss at a first rate and said polymer is reacted with said reactant until said weight loss rate is reduced to a rate less than 20% of said first rate loss.

References Cited

UNITED STATES PATENTS

| | | | |
|---|---|---|---|
| 2,989,509 | 6/1961 | Hudgin et al. | 260—67 |
| 3,219,623 | 11/1965 | Berardinelli | 260—45.95 |
| 3,225,005 | 12/1965 | Asmus et al. | 260—67 |

WILLIAM H. SHORT, *Primary Examiner.*

SAMUEL H. BLECH, *Examiner.*

L. M. PHYNES, *Assistant Examiner*